United States Patent [19]
Salam

[11] 3,872,439
[45] Mar. 18, 1975

[54] ELECTRONIC SWITCHING CIRCUIT FOR BIDIRECTIONAL TRANSFER

[76] Inventor: Hassan Paddy Abdel Salam, 80 Vicarage Ct., London, W-8, England

[22] Filed: Feb. 1, 1970

[21] Appl. No.: 438,767

[52] U.S. Cl. .......................... 340/166 R, 340/147 R
[51] Int. Cl. .......................... H04q 3/00
[58] Field of Search 340/166 R; 179/18 ET, 18 GF; 330/30 D

[56] References Cited

UNITED STATES PATENTS 3,550,088 12/1970 Jones .......................... 340/166 R

*Primary Examiner*—Harold I. Pitts
*Attorney, Agent, or Firm*—Lawrence E. Laubscher

[57] ABSTRACT

A switching means operable to effect selective bidirectional signal transfer between a first and a second signal terminal includes amplifier means controllable between an inhibited condition and an enabled condition.

10 Claims, 6 Drawing Figures

ELECTRONIC SWITCHING CIRCUIT FOR BIDIRECTIONAL TRANSFER

BACKGROUND OF THE INVENTION

This invention relates to analog switching devices selectively providing bidirectional signal transfer between a first and a second signal terminal.

Known switching devices of this kind have often used individual signal paths for the two directions of signal transfer and have not usually had low effective series resistance.

SUMMARY OF THE INVENTION

It is an object of the present invention to provide an analog electronic switching device capable of being used in the speed circuits of telephone systems.

It is also an object of the invention to provide an analog electronic switching device having a very low series resistance as compared with some known electronic switching devices.

It is a further object of the invention to provide an analog electronic swithcing device capable of establishing bidirectional signal transfer between any of a plurality of first signal terminals and any of a plurality of second signal terminals.

Embodiments of the invention include controlled differential amplifier means arranged in an enabled condition to provide at a second signal terminal a signal current proportional to and in phase with the difference between signals appearing at a first signal terminal and at said second signal terminal and to provide at said first signal terminal a signal current proportional to and in phase with the difference between the signals appearing at said second and said first signal terminals.

Preferred features and advantages of the invention will become apparent from the following description given with reference to the drawings.

DESCRIPTION OF THE PREFERRED EMBODIMENT

Figure 1:
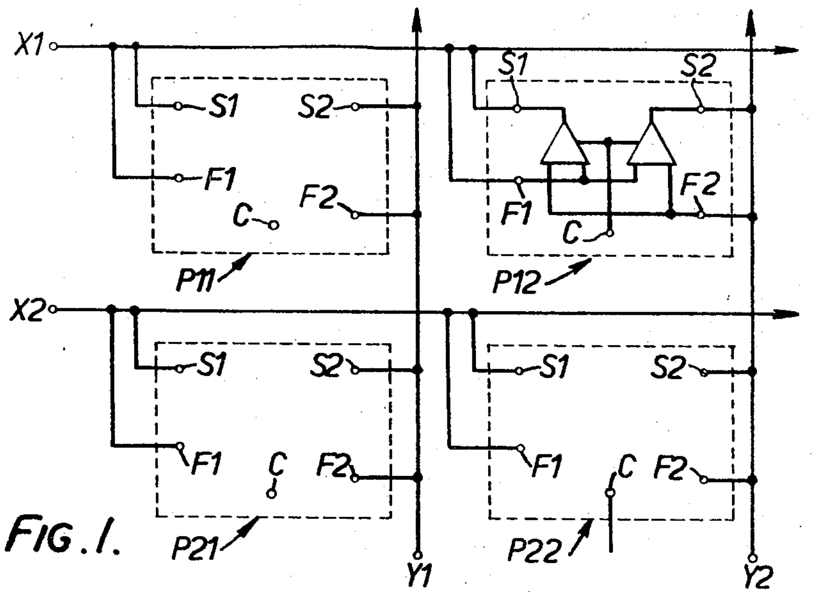
FIG. 1 is a partly schematic circuit diagram illustrating an embodiment of the invention applied in a telephone exchange using electronic coordinate switching.
Figure 2:
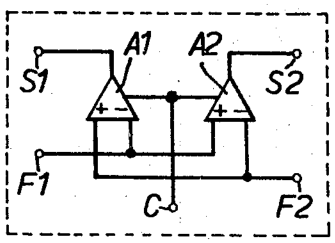
FIG. 2 is a circuit diagram of one embodiment of switching element in accordance with the invention.

FIG. 1 shows a 2 by 2 array of crosspoints forming part of a telephone exchange including switching means according to one embodiment of the invention. The array can, of course, be larger and it can be made as an integrated circuit. The crosspoint switching elements P11, P12, P21, P22 are identical to each other. As shown in FIG. 2, each crosspoint switching element uses two controlled amplifiers A1, A2 having outputs S1, S2 respectively, having common but cross-connected differential input terminals F1, F2 and having a common control input terminal C. F1 is connected to the non-inverting input of A2 and to the inverting input of A1 while F2 is connected to the non-inverting input of A1 and to the inverting input of A2. When an ON gating signal is applied to control terminal C, both amplifiers are enabled and a signal appears at S2, the output of A2, which is proportional to the difference between the potentials of common input terminals F1 and F2 and in phase with this difference, and a signal appears at S1, the output of A1, which is proportional to the difference between the potentials of terminals F2 and F1 and in phase with this latter difference. When an OFF gating signal is applied to terminal C the gains of the amplifiers are reduced to zero, and no output signals will appear.

In FIG. 1, at each cross point, terminals F1, S1 of the respective switching element are connected to the X bus associated with the cross point and terminals F2, S2 are connected to the Y bus associated with the cross point. To achieve signal transmission between bus X1 and bus Y2, for example, an ON control signal is applied to control terminal C of cross point switching element P12 and this enables the amplification means within this element. Amplifier A2 applies a signal current to bus Y2 which is proportional to the gain of the amplifier and to the difference in signal potential between bus X1 and bus Y2, causing the signal potential at bus Y2 to follow that at bus X1. Similarly amplifier A1 applies a signal current to bus X1 which is proportional to its gain and to the difference in signal potential between bus Y2 and bus X1, causing the signal potential at bus X1 to follow that at bus Y2. With amplifiers having very high input impedances, very high output impedances and very high gains, the cross point approaches an ideal switch, providing bidirectional signal transmission without attenuation when the control gating signal is ON, and high isolation when the control gating signal is OFF.

Figure 3:
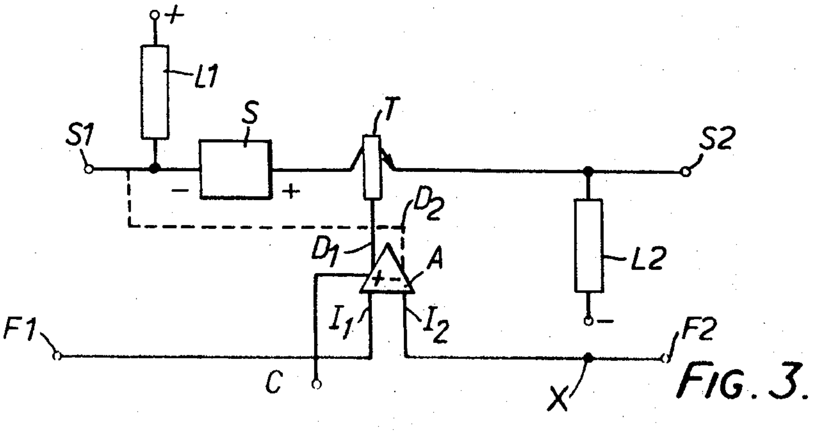
FIG. 3 is a circuit diagram of another embodiment of switching element.

An alternative circuit arrangement that can be used for the crosspoint is shown in FIG. 3. This has an output stage comprising a variable impedance device here provided by a transistor T, its emitter load L2 and its collector load L1. There is a d.c. level shifting device S (for example a bias source) in series with the collector of the transistor which provides a biasing potential that enables the transistor to be operable even when the output terminals S1 and S2 of the output stage have the same d.c. potential. The output stage receives a signal from output terminal D1 of a controlled differential amplifier A when A is enabled and acts as a phase-splitter. Controlled differential amplifier A has differential inputs I1 and I2, a control terminal C for turning it on and off and direct and inverted outputs D1, D2 respectively. When the amplifier A is turned on, or enabled, an increase in potential of I1 relative to I2 causes an increase in the potential of D1 which in turn causes an increase in the potential of S2 and a decrease in potential of S1. Similarly an increase in potential of I2 relative to I1 causes an increase in the potential of S1 and a decrease in the potential of S2. Thus for signal transmission the arrangement is functionally equivalent to that descirbed in relation to FIG. 2. When an ON signal is applied to terminal C, and external circuit connected to S2 has a signal applied to it which is proportional to the difference in potential between F1 and F2 and is in phase with this difference, and an external circuit connected to S1 has a signal applied to it which is proportional to the difference in potential between F2 and F1 and is in phase with this last mentioned difference. When an OFF signal is applied to control terminal C, amplifier A is cut off, causing the output stage in turn to be cut off, so that the output terminals S1 and S2 are isolated from one another.

Loads L1, L2 are shown as being internal to the arrangement in FIG. 3, but they could be external. They could, furthermore, be terminal loads at the ends of a chain of switching elements of which the arrangement is used to form one or more of the switching elements.

If the loads L1, L2 are made internal, they should ideally be of infinite impedance and may in practice take the form of constant-current devices of known kind. The input and output impedances of amplifier A should also, ideally, be infinite.

The output terminal D2 of amplifier A need not be used, but if it is connected to terminal S1 as indicated by the broken line, this has the advantage of ensuring that the nett a.c. component of current flowing into the output stage from A when C is ON is zero, so that the output stage presents an infinite impedance to ground for a.c. assuming that L1 and L2 are infinite.

Bipolar transistor T can be replaced with an insulated gate field-effect transistor of equivalent polarity. This has the advantage that the control electrode is of very high impedance, and the dotted connection can be eliminated while maintaining a very high impedance of the output stage to ground.

Figure 3A:
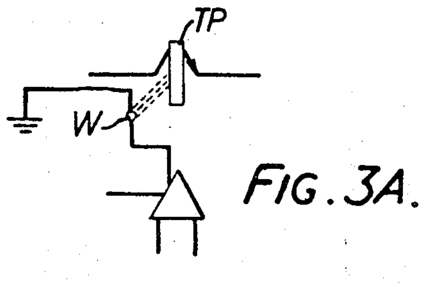
FIG. 3A is a diagram illustrating a possible modification of the arrangement of FIG. 3.

Another way of avoiding the flow of alternating currents from A to the output stage is to provide an optical signal transfer means between the output of amplifier A and the variable impedance devices. This may be done, as illustrated in FIG. 3A, by replacing transistor T by a phototransistor TP having its base B electrically isolated, and to illuminate the base B with light from a light emitting diode W driven by the D1 output of amplifier A, the remainder of the circuit being as in FIG. 3.

The level shifting network S in series with transistor T can be eliminated if a potential drop between terminals S1 and S2 of the order of, say, one-half a volt can be tolerated. This potential drop maintains transistor T active. In this case a d.c. level shifting network is inserted at X, between F2 and I2, providing a positive shift of one-half volt of $I_2$ relative to F2. When F1 is connected to S1 and F2 is connected to S2, as when the arrangement is a cross point switching element, and control C is ON, the arrangement will adjust itself so that d.c. drop appears between S1 and S2 which is very nearly equal to the d.c. shift providing at X.

An *m* by *n* array of the type described with reference to FIG. 1 requires amplification to be provided at each crosspoint. It is desirable to reduce the number of amplifiers in the array, for economy, and this can be achieved by the arrangement shown in FIG. 4, which provides a 3 by 2 array having X terminals X1, X2, X3 and Y terminals Y1, Y2. N1 and N2 are switching elements of the type described with reference to FIG. 2. G11*a*, G11*b*; G12*a*, G12*b*, etc. are pairs of semiconductor switches and the pairs can be turned on or off by application of control signals to K11, K12, etc.

The semiconductor switches G11*a*, G11*b*, etc. are conveniently of the type including in the signal path a symmetrical transistor and means for biasing the transistor into a conductive condition by application of bias current from a high impedance source when the signal path is to be established.

To connect X1 selectively to Y2, say, switches G12*a* and G12*b* are turned on by applying an ON signal to K12. This causes S1 of N2 to be connected to X1 via G12*a* and F1 of N2 to be connected to X1 via G12*b*. At the same time, switching element N2 is enabled by application of an ON signal to its terminal C. Alternatively, the element could be permanently enabled. The resultant connection between X1 and Y2 is equivalent to that described with reference to cross point switching element P12 of FIG. 1.

Switching elements N1, N2 could, if desired, be replaced by arrangements of the type described with reference to FIG. 3.

Figure 5:
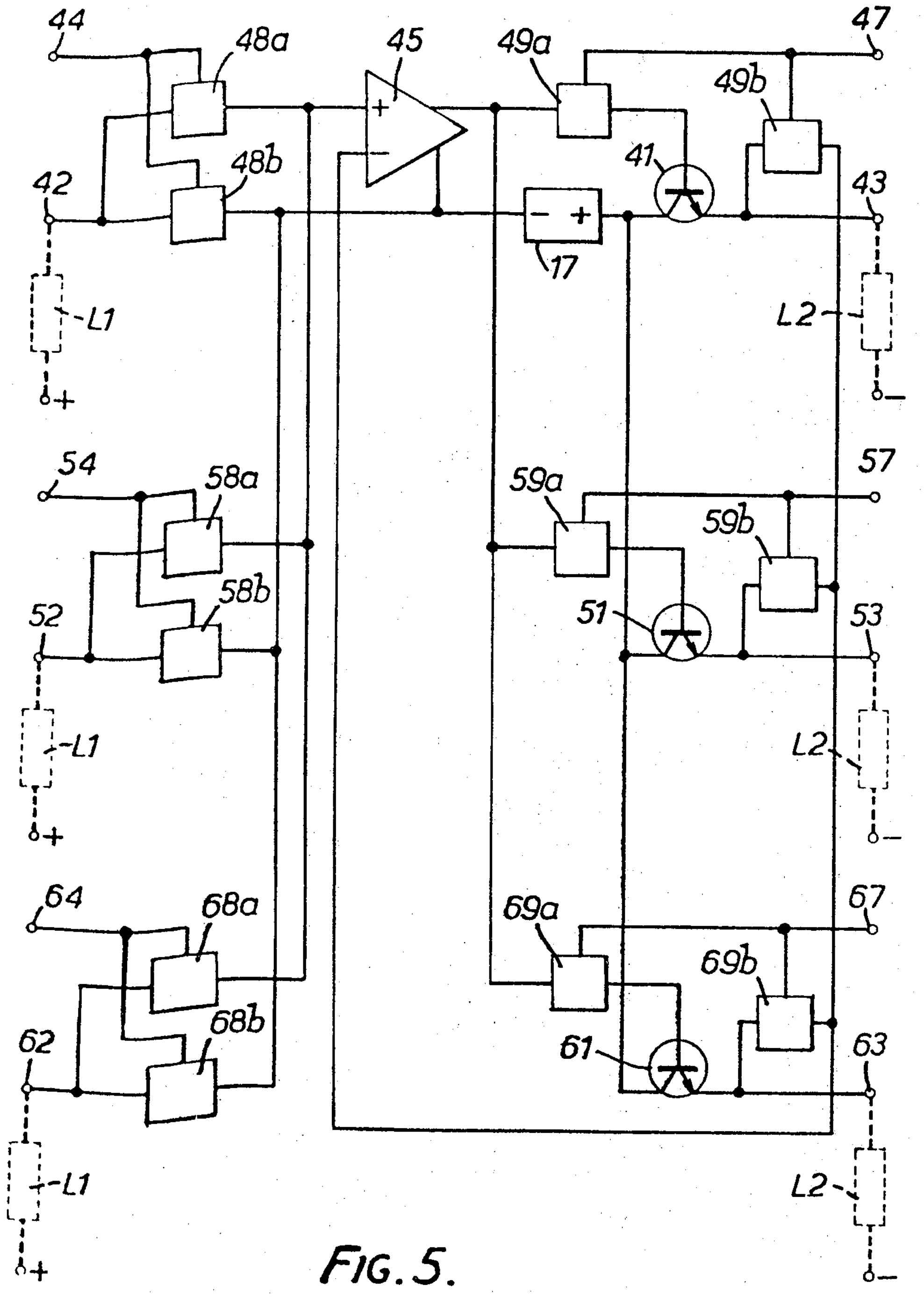
FIG. 5 is a circuit diagram of another embodiment of telephone exchange using electronic coordinate switching including the invention.

The arrangement illustrated by FIG. 5 provides a multi-way switch by means of which any one of three input signal terminals 42, 52, 62 may be connected through a bidirectional signal path to any one of three output terminals 43, 53, 63, by way of a respective transistor 41, 51, 61, as the case may be. In order that these transistors shall be provided with the necessary operating potentials, load resistors L1 and L2, returned respectively to opposite poles of a source of operating potential, must be provided. These components are not necessarily connected directly to terminals 42, 52, 62 and 43, 53, 63, as illustrated, but may be connected thereto by way of further switching means, if desired. Suppose that input terminal 42 is to be connected with output terminal 63. Enabling signals are applied to control terminals 44 and 67, from the former of which two solid-state switches **48*a*, 48*b* are enabled and from the latter of which two further solid-state switches 69*a*, 69*b* are enabled. Switch 48*a* connects input terminal 42 to the non-inverting input of a common amplifier 45 while switch 48*b* connects input terminal 42 by way of a bias source 17 to the collectors of all three transistors 41, 51 and 61. Of these, only transistor 61 is made operative by the application of the enabling signal to terminal 67, since this closes a switch 69*a* to connect the direct output of amplifier 45 to the base of transistor 61 and also closes a switch 69*b* to connect output terminal 63 to the inverting input of amplifier 45. The inverted output of amplifier 45 is connected to the common line leading via bias source 17 to the collectors of all the three transistors 41, 51, 61**. It will be seen that, ignoring the portions of the arrangement which are inoperative, the resulting circuit configuration is functionally equivalent to that of FIG. 3 with S1 connected to F1 and S2 to F2.

It will be seen that by applying an enabling signal to either of terminals 54 or 64, rather than terminal 44, the pairs of switches **58*a*, 58*b* or 68*a*, 68*b* may be closed to connect input terminal 52 or 62 with output terminal 63, while by applying an enabling signal to terminal 47 or 57, in place of terminal 67, the pairs of switches 49*a*, 49*b* or 59*a*, 59*b* may be closed to connect the selected input terminal to output terminal 43 or 53 respectively. Whichever of input and output control terminals 44, 54, 64 and 47, 57, 67 are provided with enabling signals, the action of transistor 41, 51 or 61** which is involved will be as described with reference to FIG. 3.

The amplifier 45 may here be an ordinary amplifier continuously in operation, without means for internal gating, since the gating is provided externally by the switches.

In those embodiments of the invention requiring a bias source, it may be advantageous to employ as the bias source a suitably illuminated photovoltaic cell. In the arrangements in FIGS. 4 and 5, if the amplifier gain (taking into account the loads external to the switching arrangement) is infinite and the input and output impedances of the amplifier are also infinite, the loss in signal between the signal terminals being interconnected is zero even if the series impedances of the individual semiconductor switches (G11*a*, G11*b* etc. in FIG. 4; 48*a*, 48*b*, 49*a*, 49*b*, etc. in FIG. 5) are non-zero. This is because the signals at the amplifier differential input terminals are exactly the same as the signals at the two terminals being interconnected (owing to the infinite impedances of the amplifier input terminals), and any minute signal difference appearing across the terminals being interconnected is counteracted by the amplifier's infinite gain. Thus an ideal multiway switch having zero series impedance between interconnected terminals is constructed out of semiconductor switches having non-zero series impedances in combination with one or two amplifiers having the characteristics just outlined. The whole arrangement in FIGS. 4 or 5 could be constructed on a single-chip integrated circuit.

The arrangement in FIG. 5 can be converted into a selector for selectively connecting a common input terminal to any one of terminals 43, 53, 63 by removing input switches 48*a*, 48*b*, 58*a*, etc. and joining both the non-inverting input and the inverted output of amplifier 45 to the common input terminal.

Bias means 17 in FIG. 5 can be replaced by a short circuit and appropriate bias means inserted in series with the line connecting switches 49*b*, 59*b*, 69*b* to the inverting input of amplifier 45.

Figure 4:
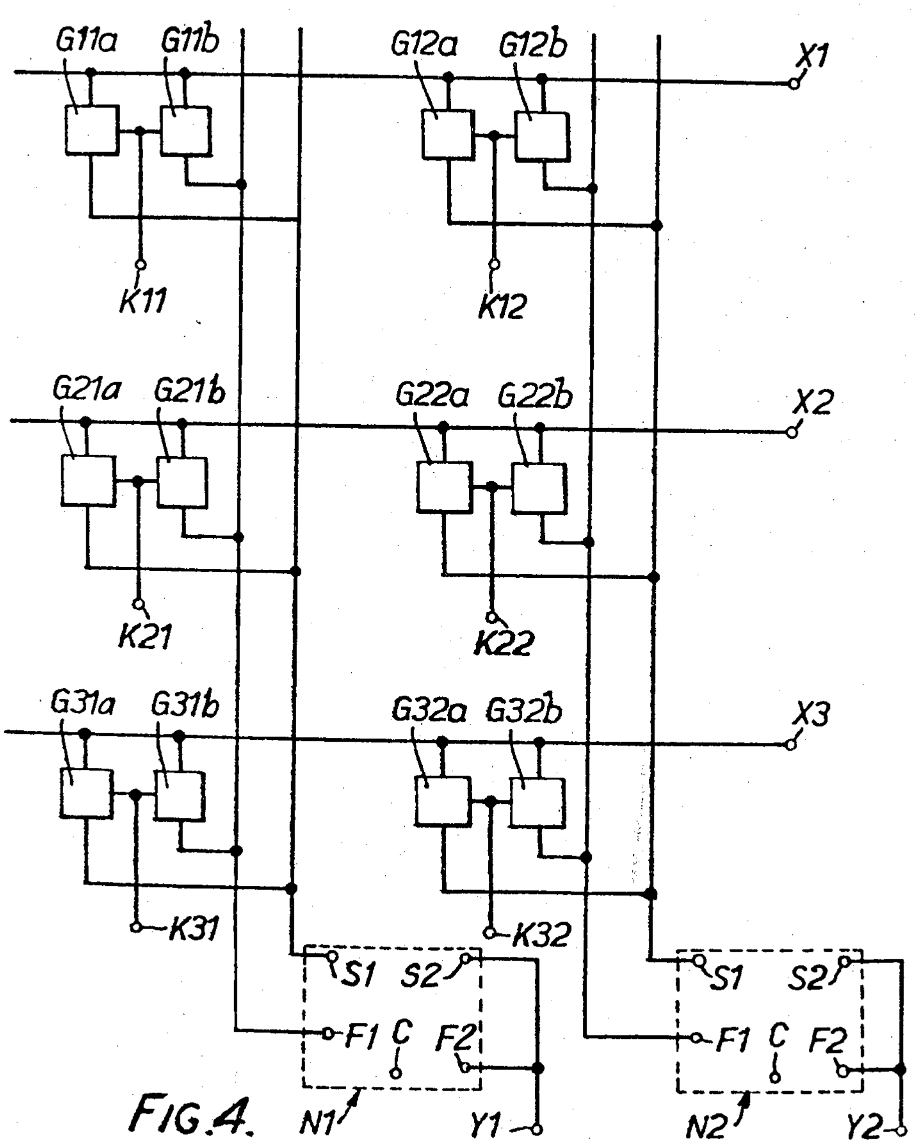
FIG. 4 is a schematic diagram of another embodiment of crossbar telephone exchange including the invention.

The arrangement in FIG. 2, as used in the selector in FIG. 1 of FIG. 4, can instead of using controlled differential amplifiers A1, A2 use two controlled summation amplifiers each of which when enabled delivers an output signal current which is proportional to the sum of its two input signal voltages and is in phase opposition to this sum. Since the phase of signals passing through the selector becomes inverted the signals appearing at the inputs of each amplifier are in phase opposition with each other, causing the amplifier to deliver a current having a magnitude proportional to the difference between the magnitudes of the input voltages. When an OFF signal is applied to terminal C the amplifiers are turned off and cannot deliver signal currents to S1 and S2.

What is claimed is:

1. Analog electronic switching means establishing selective bidirectional signal transfer between a first and a second signal terminal, said switching means including signal amplifier means controllable between a first condition in which said amplifier means provides coupling between said signal terminals to deliver at said second signal terminal a signal current having a magnitude proportional to the difference between the magnitudes of the signal potentials at said first and said second signal terminals and to deliver at said first signal terminal a signal current having a magnitude proportional to the difference between the magnitudes of the signal potentials at said second and said first signal terminals and a second condition in which signal coupling between said signal terminals is inhibited.

2. The invention as claimed in claim 1 wherein said signal amplifier means includes an amplifier having a control terminal, said amplifier exhibiting zero gain in response to an inhibiting signal applied to said control terminal and exhibiting a power gain greater than unity in response to an enabling signal applied to said control terminal.

3. The invention as claimed in claim 2 wherein said signal amplifier means has inverting and non-inverting inputs and direct and inverted outputs and wherein signal paths are provided between each of said inverting amplifier input and said direct amplifier output and one of said first and second signal terminals and between each of said non-inverting amplifier input and said inverted amplifier output and the other of said first and second signal terminals.

4. The invention as claimed in claim 1 for establishing bidirectional signal transfer between a selected one of a plurality of first signal terminals and a common second signal terminal, including:

amplifier means common to all said input terminals;

selector means operable to couple said amplifier means between said selected first signal terminal and said second signal terminal to deliver at said second signal terminal a signal current having a magnitude proportional to the difference between the magnitudes of the signal potentials at said selected first signal terminal and at said second signal terminal and to deliver at said selected first signal terminal a signal current having a magnitude proportional to the difference between the magnitudes of the signal potentials at said second signal terminal and said selected first signal terminals.

5. The invention as claimed in claim 4 wherein said signal amplifier means has inverting and non-inverting inputs and direct and inverted outputs and wherein signal paths are provided between each of said inverting amplifier input and said direct amplifier output and one of said selected first signal terminal and said second signal terminals and between each of said non-inverting amplifier input and said inverted amplifier output and the other of said selected first signal terminal and said second signal terminal, together with switching means operable selectively to establish said signal paths between said selected one of said first terminals and said respective amplifier input and output.

6. The invention as claimed in claim 1 for establishing bidirectional signal transfer between any one of a first plurality of first signal terminals and any one of a second plurality of second signal terminals, including a plurality of said signal amplifier means each associated with a respective one of said second signal terminals, and switching means operable to couple each of said signal amplifier means selectively between any selected one of said first signal terminals and the associated one of said second signal terminals, whereby said amplifier delivers at the associated said second signal terminal a signal current having a magnitude proportional to the difference between the magnitudes of the signal potentials at said selected first signal terminal and said associated second signal terminal and to deliver at said selected first signal terminal a signal current having a magnitude proportional to the difference between the magnitudes of the signal potentials at said associated second and said selected first signal terminals.

7. The invention as claimed in claim 6 wherein each said amplifier means has inverting and non-inverting inputs and direct and inverted outputs and wherein signal paths are provided between each of said inverting amplifier input and said direct amplifier output and one of said selected first signal terminal and said associated second signal terminal and between each of said non-inverting amplifier input and said inverted amplifier output and the other of said selected first signal terminals and said associated second signal terminal, together with switching means operable selectively to establish said signal paths between said selected first signal terminal and said respective amplifier input and output.

8. The invention as claimed in claim 2 wherein said signal amplifier means has inverting and non-inverting inputs and direct and inverted outputs and includes in its output stage a signal controllable variable impedance device connected between said direct and inverted outputs and means causing said device to be controlled by a signal from a preceding stage of the amplifier, and wherein signal paths are provided between each of said inverting amplifier input and said direct amplifier output and one of said first and second signal terminals and between each of said non-inverting amplifier input and said inverted amplifier output and the other of said first and second signal terminals.

9. Analog electronic switching means as claimed in claim 1 establishing selective bidirectional signal transfer between each of a plurality (N) of first signal terminals and each of a plurality (M) of second signal terminals, comprising a third plurality (N × M) of signal amplifier means each connected between a respective one of said first signal terminals and a respective one of said second signal terminals, and means for controlling each said signal amplifier means individually between said first and second conditions.

10. Analog electronic switching means as claimed in claim 1 selectively establishing bidirectional signal transfer between any selected one of a number of first signal terminal and any selected one of a plurality of second signal terminals, including a plurality of amplifier output stages equal in number to said plurality of second signal terminals, each said amplifier output stage having a signal input terminal, a direct output coupled to a respective one of said second signal terminals and an inverted output, a common amplifier input stage having a direct input, an inverting input and a signal output, switching means operable selectively to connect said direct input to any selected one of said first signal terminals, to connect said inverting input to any selected one of said second signal terminals, to connect said signal output to said signal input terminal of said amplifier output stage coupled to said selected second signal terminal, and to couple said inverted output to said selected one of said first signal terminals.

* * * * *

UNITED STATES PATENT OFFICE
CERTIFICATE OF CORRECTION

PATENT NO. : 3,872,439
DATED : March 18, 1975
INVENTOR(S) : Hassan P. A. Salam

It is certified that error appears in the above-identified patent and that said Letters Patent are hereby corrected as shown below:

In the Heading, add:

-- Foreign Application Priority Data

| | | |
|---|---|---|
| February 9, 1973 | Great Britain | 6518/73 |
| June 11, 1973 | Great Britain | 27769/73 -- |

In the Specification:

Column 1, line 22, change "swithcing" to:

-- switching --

Signed and Sealed this

*second* Day of *December 1975*

[SEAL]

*Attest:*

RUTH C. MASON
*Attesting Officer*

C. MARSHALL DANN
*Commissioner of Patents and Trademarks*